(12) United States Patent
Yin et al.

(10) Patent No.: US 9,219,258 B2
(45) Date of Patent: Dec. 22, 2015

(54) MOUNTING APPARATUS FOR BATTERY MODULE

(71) Applicant: ShenZhen Treasure City Technology Co., LTD., Shenzhen (CN)

(72) Inventors: Xiu-Zhong Yin, Shenzhen (CN); Xiu-Quan Hu, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 354 days.

(21) Appl. No.: 13/958,289

(22) Filed: Aug. 2, 2013

(65) Prior Publication Data

US 2014/0162103 A1 Jun. 12, 2014

(30) Foreign Application Priority Data

Dec. 7, 2012 (CN) .......................... 2012 1 0521971

(51) Int. Cl.
*H01M 10/10* (2006.01)
*H01M 2/10* (2006.01)
(52) U.S. Cl.
CPC .................................. *H01M 2/1022* (2013.01)
(58) Field of Classification Search
CPC .................................................. H01M 2/1022
USPC ................................................ 361/600–837
See application file for complete search history.

(56) References Cited

U.S. PATENT DOCUMENTS

| 2007/0065716 | A1* | 3/2007 | Hsu | H01M 2/1022 429/164 |
| 2009/0130907 | A1* | 5/2009 | Chen | H01R 13/64 439/627 |
| 2010/0279169 | A1* | 11/2010 | Ren | G03B 17/02 429/175 |
| 2012/0009453 | A1* | 1/2012 | Chen | H01M 2/1022 429/100 |
| 2012/0039031 | A1* | 2/2012 | Miyagi | E05C 1/00 361/679.01 |
| 2012/0099252 | A1* | 4/2012 | Cheng | H01M 2/1022 361/679.01 |
| 2012/0268900 | A1* | 10/2012 | Fan | H01M 2/1055 361/747 |

* cited by examiner

*Primary Examiner* — Ula C Ruddock
*Assistant Examiner* — Scott J Chmielecki
(74) *Attorney, Agent, or Firm* — Novak Druce Connolly Bove + Quigg LLP

(57) ABSTRACT

A mounting apparatus for securing a battery module to an enclosure includes a bracket and a latching member. The bracket is secured to the enclosure and defines a receiving space for receiving the battery module. The latching member is attached to the bracket and includes a resilient portion and a blocking flange perpendicularly connected to the resilient portion. The blocking flange is engaged with the battery module to prevent the battery module from disengaging from the receiving space, and the resilient portion is resiliently deformable to disengage the blocking flange from the battery module so that the battery module is easily installed or detached from the enclosure without extra tools.

19 Claims, 5 Drawing Sheets

MOUNTING APPARATUS FOR BATTERY MODULE

BACKGROUND

1. Technical Field

The present disclosure relates to mounting apparatus, and more particularly to a mounting apparatus for a battery module.

2. Description of Related Art

A server includes a battery and an enclosure. The battery may be received in a receiving box, and the receiving box may be attached to the enclosure with screws to secure the battery to the enclosure. A tool, such as a screwdriver, may be used to fasten or unfasten the screws when the battery is assembled or disassembled. However, the assembly and disassembly of the battery is laborious and time-consuming. Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
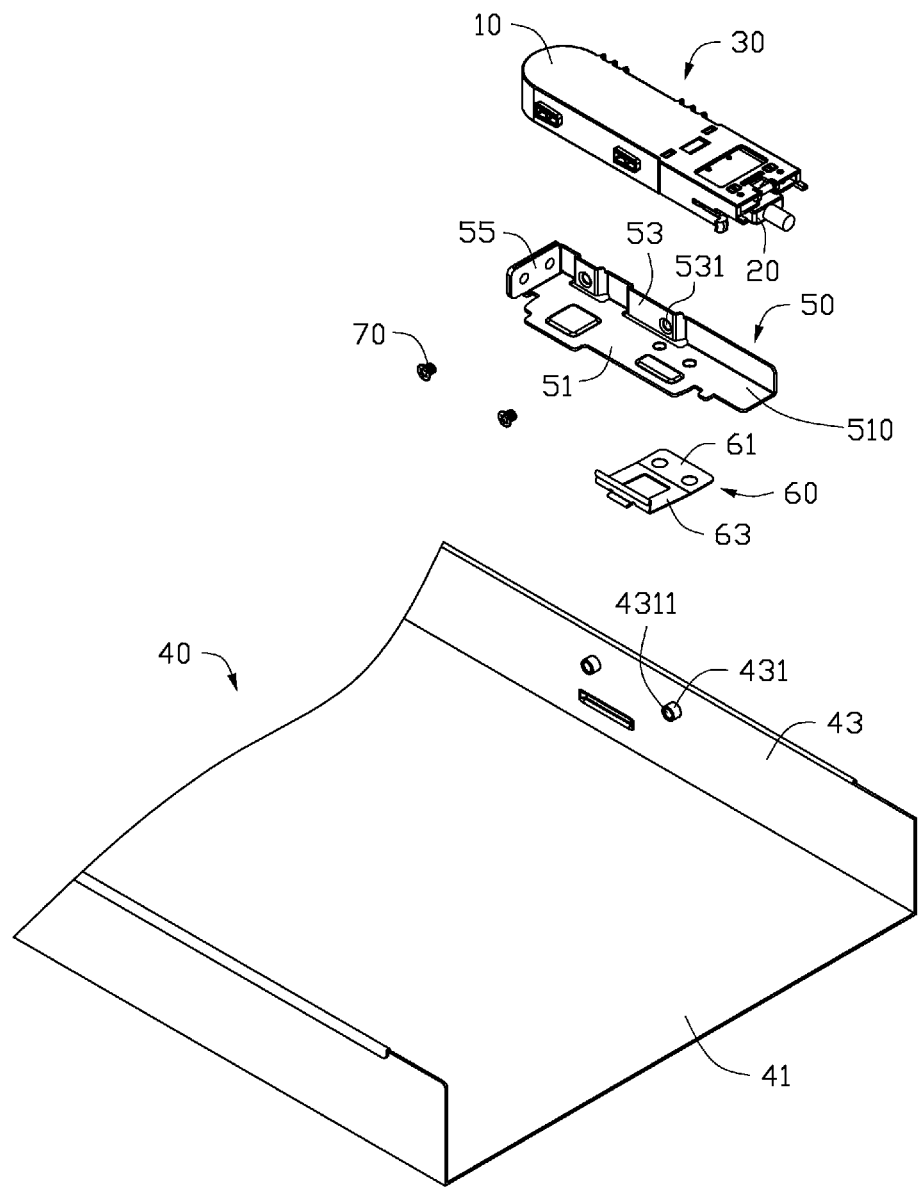
FIG. 1 is an exploded, isometric view of a mounting apparatus, an enclosure and a battery module in accordance with an embodiment. The mounting apparatus includes a bracket and a latching member.
Figure 2:
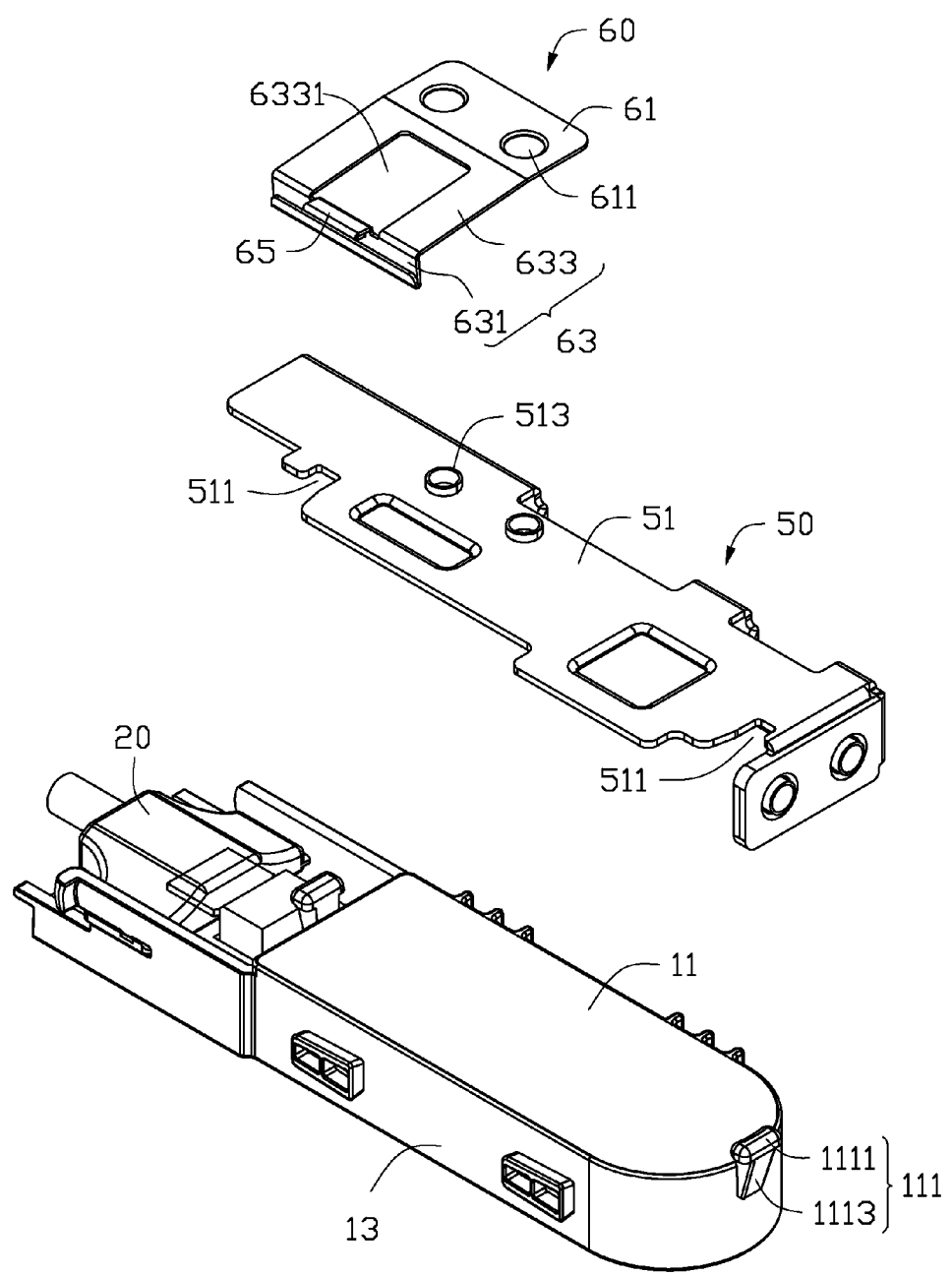
FIG. 2 is similar to FIG. 1, but viewed from a different aspect.

FIG. 1 shows an embodiment of a mounting apparatus configured to secure a battery module 30 to an enclosure 40. The mounting apparatus includes a mounting bracket 50, a latching member 60 and two hooks 111 (shown in FIG. 2).

The battery module 30 includes a receiving box 10 and a body 20 received in the receiving box 10. The receiving box 10 includes a receiving bottom wall 11 and a receiving sidewall 13 connected to the receiving bottom wall 11. The two hooks 111 are located on opposite sides of the receiving bottom wall 11, and each of the two hooks 111 includes a latching portion 1111. In one embodiment, each of the two hooks 111 is substantially T-shaped.

The enclosure 40 includes a bottom plate 41, a first sidewall 43, and a second sidewall (not labeled) opposite to the first sidewall 43. The first sidewall 43 and the second sidewall extend upwards from opposite edges of the bottom plate 41. In one embodiment, the first sidewall 43 and the second sidewall are substantially parallel to each other and are substantially perpendicular to the bottom plate 41. Two positioning posts 431 protrude from the first sidewall 43 towards the second sidewall 45, and each positioning post 431 defines a positioning hole 4311 corresponding to a fastener 70. The fastener 70 can be a screw, a bolt, and so on.

The bracket 50 includes a supporting plate 51, an installation piece 53, and a limiting piece 55. The installation piece 53 and the limiting piece 55 are located at two adjacent edges of the supporting plate 51. The supporting plate 51, the installation piece 53, and the limiting piece 55 cooperatively define a receiving space 510 for receiving the battery module 30. The supporting plate 51 defines two cutouts 511 corresponding to the two hooks 111. Two securing posts 513, corresponding to the latching member 60, extend from a bottom portion of the supporting plate 51. The installation piece 53 defines two installation holes 531 corresponding to the two positioning posts 431.

The latching member 60 includes a securing piece 61 and an engaging piece 63. The engaging piece 63 includes a resilient portion 633 and a blocking flange 631. The resilient portion 633 defines an opening 6331 extending to the blocking flange 631. In on embodiment, an obtuse angle is defined between the securing piece 61 and the resilient portion 633. The securing piece 61 extends from one edge of the resilient portion 633 and defines two securing holes 611 corresponding to the two securing posts 513. The blocking flange 631 extends perpendicularly from an edge of the resilient portion 633 opposite to the securing piece 61. An actuating tab 65 extends outwards from an edge of the opening 6331. The actuating tab 65 is substantially perpendicular to the blocking flange 631 and is substantially parallel to the resilient portion 633.

Figure 3:
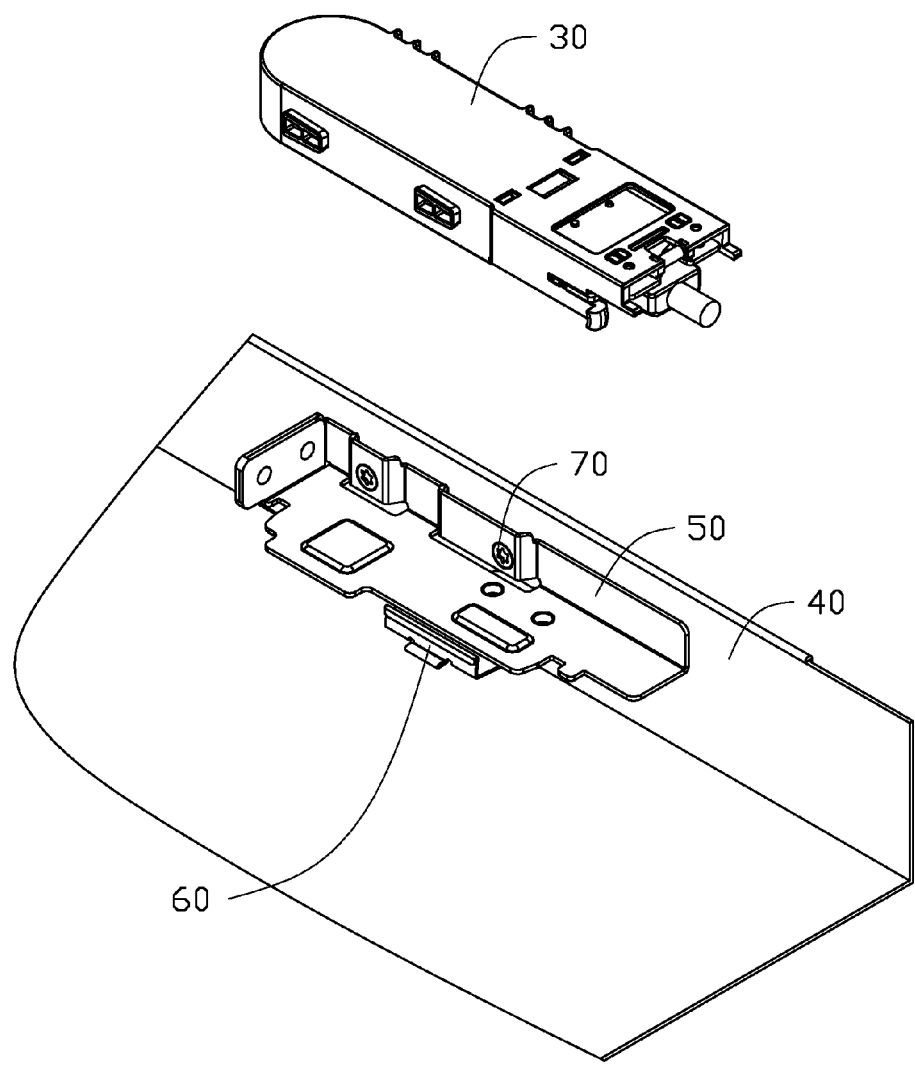
FIG. 3 is an assembled view of the enclosure and the mounting apparatus of FIG. 1.

FIG. 3 shows that in assembly, the latching member 60 is placed below the bracket 50. Each of the two securing posts 513 is received in a corresponding securing hole 611 of the latching member 60. There is an interference fit between the two securing holes 611 and the two securing posts 513, such that the latching member 60 is secured to a bottom portion of the bracket 50, and the engaging piece 63 abuts the supporting plate 51. The blocking flange 631 extends substantially perpendicularly to the supporting plate 51.

The installation piece 53 abuts the first sidewall 43, and the two positioning posts 431 are received in the two installation holes 531. The two fasteners 70 are received by the two installation holes 531 and the two positioning holes 4311 to lock and secure the mounting apparatus to the enclosure 40.

Figure 4:
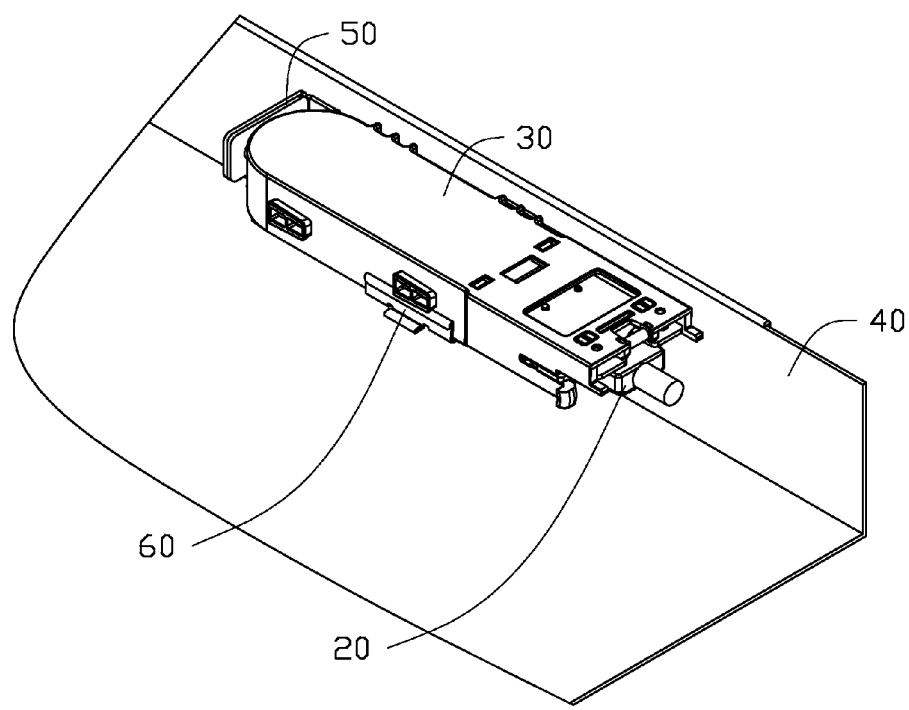
FIG. 4 is an assembled view of the mounting apparatus, the enclosure, and the battery module of FIG. 1.
Figure 5:
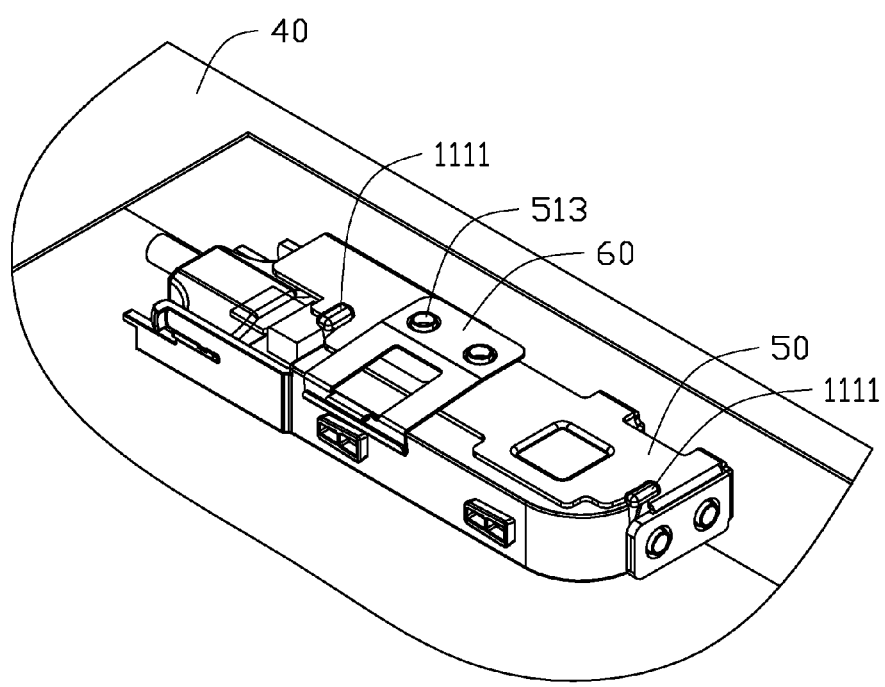
FIG. 5 is a partial view of the mounting apparatus, the enclosure, and the battery module of FIG. 4.

FIGS. 4 and 5 show that in assembly of the battery module 30, a force is applied to the actuating tab 65 to deform the engaging piece 63. The latching portions 1111 of the two hooks 111 respectively extend through the two cutouts 511 of the bracket 50. The battery module 30 is pushed towards the installation piece 53, until the latching portions 1111 of the two hooks 111 engage with the supporting plate 51. Therefore, the battery module 30 is prevented from moving in a plane perpendicular to the supporting plate 51. The actuating tab 65 is released, and the resilient portion 633 resiliently rebounds to engage the blocking flange 631 with the receiving sidewall 13, thereby preventing the battery module 30 from moving along a first direction perpendicular to the plane. Thus, the battery module 30 is secured to the enclosure 40.

In disassembly of the battery module 30, a force is applied to the actuating tab 65 to disengage the blocking flange 631 from the battery module 30, and the battery module 30 is pushed along the first direction to disengage the latch portion 1111 from the supporting plate 51. Therefore, the battery module 30 is easily detached from the bracket 50.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A mounting apparatus for securing a battery module to an enclosure comprising:
   a bracket secured to the enclosure, the bracket defining an receiving space for receiving the battery module; and
   a latching member attached to the bracket; the latching member comprising a resilient portion and blocking flange perpendicularly connected to the resilient portion, the blocking flange engaged with the battery module, to prevent the battery module from disengaging from the receiving space; and the resilient portion is resiliently deformable to disengage the blocking flange from the battery module.

2. The mounting apparatus of claim 1, further comprising two hooks located on the battery module; wherein the bracket comprises a supporting plate, the supporting plate defines two cutouts, and each of the two hooks are engaged in each of the two cutouts for preventing the battery module from moving in a plane perpendicular to the supporting plate.

3. The mounting apparatus of claim 2, wherein the blocking flange is substantially perpendicular to the supporting plate and abuts the battery module for preventing the battery module from moving a first direction perpendicular to the plane.

4. The mounting apparatus of claim 3, wherein the bracket further comprises an installation piece and a limiting piece, the installation piece and the limiting piece are located on two adjacent sides of the supporting plate, and the installation piece, and the limiting piece and the supporting plate cooperatively define the receiving space.

5. The mounting apparatus of claim 3, wherein the latching member further comprises a securing tab extending from the resilient portion, and the securing tab is detachably secured to the supporting plate.

6. The mounting apparatus of claim 5, wherein an obtuse angle is defined between the resilient portion and the securing tab.

7. The mounting apparatus of claim 3, wherein the resilient portion defines an opening extending to the blocking flange, and an actuating tab extends from one edge of the opening.

8. The mounting apparatus of claim 2, wherein each of the two hooks comprises a connecting portion and a latching portion, and the latching portion of each of the two hooks extends through each of the two cutouts, to engage with the supporting plate.

9. The mounting apparatus of claim 2, wherein the bracket further comprises an installation piece connected to the supporting plate, and the installation piece is secured to the enclosure.

10. The mounting apparatus of claim 9, wherein the installation piece is substantially parallel to the blocking flange.

11. A mounting apparatus for securing a battery module to an enclosure comprising:
    two hooks located on the battery module;
    a bracket secured to the enclosure, the bracket comprising a supporting plate, and the supporting plate defines two cutouts for receiving the two hooks to prevent the battery module from moving in a plane perpendicular to the supporting plate; and
    a latching member attached to the supporting plate, the latching member comprising an engaging piece, the engaging piece is engaged with the battery module, to prevent the battery module from moving along a first direction that perpendicular to the plane.

12. The mounting apparatus of claim 11, wherein the engaging piece comprising a resilient portion and a blocking flange connected to the resilient portion, the blocking flange is engaged with the battery module, and the resilient portion is resiliently deformable to disengage the blocking flange from the battery module.

13. The mounting apparatus of claim 12, wherein the blocking flange is substantially perpendicular to the resilient portion.

14. The mounting apparatus of claim 12, wherein the latching member further comprises a securing tab extending from the resilient portion, and the securing tab is detachably secured to the supporting plate.

15. The mounting apparatus of claim 14, wherein an obtuse angle is defined between the securing tab and the resilient portion.

16. The mounting apparatus of claim 12, wherein the resilient portion defines an opening extending to the blocking flange, and an actuating tab extends one edge of the opening.

17. The mounting apparatus of claim 10, wherein each of the two hooks comprises a connecting portion and a latching portion, and the latching portion of each of the two hooks extends through each of the two cutouts, to engage with the supporting plate.

18. The mounting apparatus of claim 10, wherein the bracket further comprises an installation piece connected to the supporting plate, and the installation piece is secured to the enclosure.

19. The mounting apparatus of claim 18, wherein the installation piece is substantially parallel to the blocking flange.

* * * * *